United States Patent Office 3,527,301
Patented Sept. 8, 1970

3,527,301
OIL RECOVERY USING NEAT SURFACTANTS
Philip J. Raifsnider, deceased, late of Denver, Colo., by Dorothy E. Raifsnider, executrix, Denver, Colo., assignor to Shell Oil Company, New York, N.Y., a corporation of Delaware
No Drawing. Filed July 29, 1968, Ser. No. 749,260
Int. Cl. E21b
U.S. Cl. 166—274                                3 Claims

ABSTRACT OF THE DISCLOSURE

An improved process for recovering oil from oil-containing subterranean reservoir formations by pretreating the formations with neat nonionic surfactants having gellable properties when in contact with connate water and/or a fluid drive, said fluid drive being injected after the formation treatment with the neat surfactant.

BACKGROUND OF THE INVENTION

Knowledge is widespread in the oil industry that the so-called "primary recovery" techniques, which include natural flow, gas lifting, gas repressurization and pumping methods, leave substantial quantities of oil in oil-bearing reservoirs. In addition, there are oil-bearing reservoirs which even though containing large quantities of oil, are incapable of being produced by primary recovery techniques. Recognition of the large amount of residual oil in many oil-producing reservoirs has led to the use of the so-called "secondary recovery" and "tertiary recovery" techniques which have as their primary purpose the economical recovery of additional quantities of the residual oil known to be present in the reservoir.

Probably one of the more common secondary or tertiary recovery techniques is the so-called "waterflooding" in which aqueous fluids are injected at one point in the reservoir at pressures sufficient to be forced out into the reservoir and toward a spaced production well or wells, there, in effect, displacing it from the pores of the reservoir and driving the oil ahead of the water front.

However, waterflooding is only advantageous when the cost of injecting water and necessary chemical modifiers is less than the value of the oil recovered. Therefore, the displacement efficiency of waterfloods has been the determining factor of whether such a technique will be used.

A problem in many waterfloods is that high injection pressures are required necessitating special equipment making the process very costly. Another problem in poor oil recovery is loss of drive fluids in the formation or due to breakthrough or fingering of the injection drive fluids. This is due to the non-uniformity of the permeability of the oil production zones resulting in losses of injection driving fluids into their zones or more permeable areas of the production zones. Fingering or breakthrough of the drive fluid (water) is still another problem which results in poor oil recovery.

Various methods are known in the art to improve oil recovery when faced with the above-mentioned problems as well as other oil recovery problems such as by selectively plugging or temporarily plugging parts of a formation with suitable solid materials or by use of surfactant materials to effect lowering of the interfacial tension at the oil-water interface thereby increasing oil recovery efficiency as discussed in U.S. Pats. 3,141,503; 3,342,262 or U.S. Pats. 3,330,344 and 3,348,611.

In most cases as described in the above cited art the selective plugging agents are generally difficult to handle and remove. Also, they have little if any effect on lowering the interfacial tension between the oil-water interface or on reduction of the injection pressure. The conventional surfactants used in water or as oil-water emulsion drive fluids have no selectivity plugging or injection pressure lowering properties.

SUMMARY OF THE INVENTION

It has now been discovered that improved oil recovery can be accomplished at reduced pressure injectivity and by selective temporary plugging by pretreating oil-bearing formations of non-uniform permeability with essentially neated or undiluted or high concentrated nonionic water-swellable, gel-forming surfactant having the partial formula

wherein X is oxygen, sulfur or nitrogen and is an organic compound selected from the group consisting of aliphatic alcohols, phenols and their corresponding thiol or mercaptan derivatives and or amine compounds and where R is an alkylene radical of from 1 to 4 carbon atoms, Y is hydrogen or a hydrocarbyl radical, $n$ is an integer of from 3 to 30, preferably 6 to 12 carbon atoms, and $m$ is an integer of from 1 to 3. Compounds represented by the formula are essential polyoxylated alcohols or amines having water-swellable or gel-forming properties when contacted with aqueous solutions. In neat or undiluted form or as concentrates of from at least 60% to 99% active surfactant materials in a suitable solvent these surfactants are flowable or pumpable at ambient temperatures or at temperatures generally below 80° C. The solvent which may be water, alcohol or a liquid hydrocarbon generally present less than 40% and preferably less than 20% of the concentrate mixture.

Flowable or pumpable polyoxylated alcohols, mercaptans or amines having preferably at least 3 to 10 oxyalkylene units can be prepared by a number of suitable means such as described in U.S. Pats. 2,964,478; 3,284,352; 3,333,634 and 3,355,390. For example, surfactants of this type can be prepared by reacting an alkanol, e.g., $C_{8-30}$ alkanol or corresponding mercaptan having the formula R'—ZH where R' is a $C_{8-30}$ alkyl radical and Z is oxygen or sulfur with ethylene oxide, propylene oxide or butylene oxide to form compounds having the formula

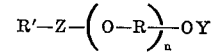

wherein the symbols R', Z, R, Y and $n$ are as defined above. Preferred oxyalkylated alkanols useful in neat or concentrated form to pretreat formations can be represented by the general Formula I represented by

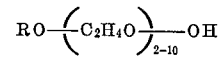

where R is an alkyl radical of 10–15 carbon atoms, the alcohol used in the ethoxylation being a mixture of alcohols of 10 to 15 carbon atoms. The ethoxylation of the alcohols can be accomplished by means well known in the art. The ethoxylation of primary alcohols to form products represented by Formula I can be achieved using a strong base of Lewis acid catalysts such as NaOH, KOH, $BF_3$ or $SnCl_2$. Mixed oxyalkylated mixtures of primary alcohols to produce compounds represented by Formula I can be prepared by the method described in U.S. Pats. 3,036,130 and 3,101,574 or as described in copending patent application to Tsatsos et al., Ser. No. 661,546, filed Aug. 18, 1967, now abandoned, and illustrated by the following example.

An alkoxylate was prepared employing as the alcohol feed an anhydrous mixture derived from 0.448 g. of sodium hydroxide and 125 g. of mixed $C_{12}$, $C_{13}$, $C_{14}$ and $C_{15}$ primary alcohols, in substantially equal proportions by weight, wherein approximately 80% of the alcohol of each carbon number was straight-chain, approximately 10% of the alcohol of each carbon number was beta-methyl branched and the remainder of the alcohol of each carbon number consisted of alcohols having beta-ethyl, beta-propyl, beta-butyl and beta-amyl branched structures.

The temperatures of the reactor in which the mixture the mixture was maintained was raised by 145±5° C. and kept at that temperature as ethylene oxide was introduced at the rate of about 4–5 g./minute to the stirred reaction mixture. During the approximately 1-hour period required to add 166 g. of ethylene oxide, the pressure remained at about 50 p.s.i.g. as the temperature was maintained below 150° C. At the conclusion of the ethylene oxide addition, the stirring was continued until the pressure decreased to about 10 p.s.ig.

A similar procedure was employed to introduce and react 145 g. of propylene oxide at a temperature of about 140° C. and a pressure during addition of 100–120 p.s.i.g. After the propylene oxide addition and after the pressure had decreased to about 30 p.s.i.g., ethylene oxide addition was begun again and carried out as before. After the final reaction period subsequent to the second addition of ethylene oxide, the product mixture was maintained at about 100° C. under a total pressure of 10 mm. to remove volatiles. The product mixture was then cooled to about 70° C. and transferred with the aid of nitrogen pressure into a bottle containing 0.65 g. of acetic acid.

Analysis of the product mixture by its nuclear magnetic resonance spectrum in conjunction with weights of the alkylene oxide employed indicated a mixture of alcohol alkoxylates having a first block averaging 6 ethylene oxide units, a second block averaging 4 propylene oxide units, and a third and a terminal block averaging 6 ethylene oxide units.

The ethoxylated alcohols are available commercially from Shell Chemical Company under the trade name "Neodol" or from Conoco under the name "Alfol" and others. The "Neodol" identified as Neodol 23–6.5 which is a mixture of $C_{12}$–$C_{13}$ alcohol having 6.5 (EO) ethoxylate groups and has the following properties as shown in Table 1.

TABLE 1

Detergent alcohol carbon number range—$C_{12}$–$C_{13}$
Melting Range, ° C.—11–15
Color, APHA (Pt-Co)—40
Specific Gravity, 50/25° C.—0.963
Flash Point, Cleveland Open Cup, ° F.—410
Fire Point, Cleveland Open Cup, ° C.—445
Cloud Point, 1% solution, ° C.—45
Hydroxyl number, mg. KOH/gm.—116
Water (Karl Fischer), percent weight—0.3
Acid value, eq./100 g.—Less than 0.001
Odor—Mild Other ethoxylated alcohols useful in aiding in oil recovery are shown in Table 2 and have the following properties where EO is —$CH_2CH_2O$— radical.

TABLE 2

| Analyses | Ethoxylates | | |
|---|---|---|---|
| | $C_{12}$–$C_{15}$ 3 EO | $C_{12}$–$C_{15}$ 7.5 EO | $C_{12}$–$C_{15}$ 9 EO |
| Ash, percent w | 0.2 max | 0.01 max | 0.01 max |
| Color, APHA | 100 max | 75 max | 75 max |
| pH, 1% Solution | 5.5–6.5 | Within 0.5 water used. | Within 0.5 water used. |
| Acid value, eq/100 g | 0.004 max | 0.0003 max | 0.0003 max |

Conoco "Alfol" alcohols such as "Alfonic" 1012–6 or 1218–6 having the structural formula:

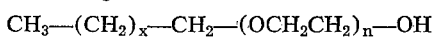

where $x$ is 8–16 and $n=5$–8. Thus, Alfonic 1012–6 is a $C_{10-12}$ primary alcohol containing 6 ethylene oxide units and 1218–6 is a $C_{12-18}$ primary alcohol containing 6 ethylene oxide units.

The ethoxylated material can be sulfated if desired such as the "Neodols" as identified above can be sulfated by reacting a $C_{12-15}$ (3 EO) alcohol with chlorosulfonic acid at around 25° C.

Water-soluble surfactants of the above type when injected into a formation tend to temporarily and selectively plug the more permeable portions of the formation, forming a water-swellable or gellable plug when contacted with connate water or with an aqueous drive fluid. Formations thus pretreated when thereafter subjected to a waterflood lower the surface tension at the water-oil interface and also lower the injection pressure resulting in increased oil and water recovery.

PREFERRED EMBODIMENT OF THE INVENTION

To illustrate the effective oil recovery which is accomplished by the process of this invention several wells were treated with neat or undiluted $C_{12}$–$C_{13}$ (6.5 EO) primary alcohol (Neodol 23–6.5) followed by waterflooding as follows:

An injection well was treated with three drums of undiluted "Neodol" 23–6.5 displaced down the tubing of a well bore into the oil production zone. Before application of the Neodol 23–6.5 a survey showed the well to be taking 710 barrels of water per day at 2900 p.s.i.g., with 13 percent of the fluid entering the perforations at 9053–9065 feet and 87 percent entering the perforations at 9132–9140 feet.

After application of Neodol 23–6.5 the well was resurveyed 9 days later and showed that the well was taking 1340 barrels of water per day at 2400 p.s.i.g. with 35 percent of the fluid entering the upper perforations and 65 percent entering the lower perforations.

Another injection well was treated with 1000 gallons of 15 percent HCl, followed in eight hours by 110 gallons of undiluted Neodol 23–6.5. A survey made prior to treatment showed 275 barrels of water per day at 2900 p.s.i.g. After treatment the survey indicated 760 barrels per day at 1700 p.s.i.g. Thus, in both tests, a significant improvement in injectivity was noted. In addition, a favorable change in injection profile occurred in one case.

Generally the drive fluid used is water, but steam miscible flooding fluids and mixtures such as water-steam flood drives can be used once the formation has been pretreated with heat or undiluted surfactants as described. The fluid drives can contain thickeners, viscosity increasers, pushers and the like, e.g., polyacrylamides and derivatives, polyalkylene oxide polymers, polyvinyl-alcohol sulfonate and the like some of which are described in U.S. Pats. 3,341,319; 3,332,904; 3,254,719; 3,367,418; 3,368,-620 and 3,370,649.

It is understood that various changes in the details described to explain the invention can be made by persons skilled in the art within the scope of the invention as expressed in the appended claims.

I claim as my invention:

1. A method of improving injectivity and permeability uniformity in an oil-bearing process in which oil in an oil-containing formation is displaced and recovered which formation has at least one injection well and one production well, the steps comprising:

(1) pretreating the formation by injection via an injection well an undiluted water-swellable gel-forming polyethoxylated $C_{12}$–$C_{15}$ primary aliphatic alcohol having from 3 to 10 ethoxylate groups in the molecule;

(2) injecting into the formation a water drive; and, (3) recovering oil via a production well.

2. The process of claim 1 wherein the alcohol is a $C_{12}$–$C_{13}$ primary aliphatic alcohol having about 6.5 ethoxy units in the molecule.

3. The process of claim 2 wherein the water drive contains a small amount of a polymeric water-soluble thickener.

References Cited

UNITED STATES PATENTS

| | | | |
|---|---|---|---|
| 2,827,964 | 3/1958 | Sandiford et al. | 166—274 |
| 3,318,379 | 5/1967 | Bond et al. | 166—273 |
| 3,333,634 | 8/1967 | Townsend et al. | 166—274 X |
| 3,347,789 | 10/1967 | Dickson et al. | 166—280 |
| 3,373,107 | 3/1968 | Rice et al. | 166—275 X |

STEPHEN J. NOVOSAD, Primary Examiner